United States Patent
Fisher, Jr. et al.

(10) Patent No.: US 8,919,149 B2
(45) Date of Patent: Dec. 30, 2014

(54) GLASS MELTING METHOD, SYSTEM, AND APPARATUS

(75) Inventors: Dale Madard Fisher, Jr., Painted Post, NY (US); Guido Peters, Bath, NY (US); Matthew John Towner, Campbell, NY (US); Piotr Janusz Wesolowski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/405,722

(22) Filed: Feb. 27, 2012

(65) Prior Publication Data
US 2012/0216568 A1 Aug. 30, 2012

Related U.S. Application Data

(60) Provisional application No. 61/447,356, filed on Feb. 28, 2011.

(51) Int. Cl.
| | | |
|---|---|---|
| *C03B 5/24* | (2006.01) | |
| *G01J 5/00* | (2006.01) | |
| *G01J 5/06* | (2006.01) | |
| *G01J 5/08* | (2006.01) | |
| *G01J 5/04* | (2006.01) | |
| *C03B 5/235* | (2006.01) | |

(52) U.S. Cl.
CPC . *C03B 5/24* (2013.01); *G01J 5/061* (2013.01); *G01J 5/0044* (2013.01); *G01J 5/084* (2013.01); *G01J 5/0806* (2013.01); *G01J 5/047* (2013.01); *G01J 5/042* (2013.01); *G01J 5/043* (2013.01); *G01J 5/0037* (2013.01); *C03B 5/235* (2013.01)
USPC ........................................ 65/29.21; 65/29.16

(58) Field of Classification Search
CPC ............ C03B 7/06; C03B 5/235; C03B 5/24; C03B 5/245; G01J 5/0037; G01J 5/0044; G01J 5/061; G01J 5/0806; G01J 5/084
USPC ..................... 65/29.1, 29.16, 29.21
See application file for complete search history.

(56) References Cited

U.S. PATENT DOCUMENTS

| | | | |
|---|---|---|---|
| 3,338,696 A | 8/1967 | Dockerty | 65/145 |
| 3,682,609 A | 8/1972 | Dockerty | 65/83 |
| 4,601,743 A * | 7/1986 | Canfield | 65/162 |
| 4,836,637 A | 6/1989 | Poorman | 350/96.21 |
| 6,542,665 B2 | 4/2003 | Reed et al. | 385/34 |
| 6,796,147 B2 * | 9/2004 | Borysowicz et al. | 65/162 |
| 2004/0079113 A1 * | 4/2004 | Hegewald et al. | 65/29.16 |
| 2009/0135260 A1 | 5/2009 | Rouvinen et al. | 348/208.11 |

FOREIGN PATENT DOCUMENTS

CN 1243104 A 2/2000

* cited by examiner

*Primary Examiner* — Matthew Daniels
*Assistant Examiner* — Cynthia Szewczyk
(74) *Attorney, Agent, or Firm* — Matthew J. Mason; Stephen S. Wentsler

(57) ABSTRACT

A glass melting furnace is operated under a set of control parameters. A glass batch is fed into the glass melting furnace and melted into molten glass. During the melting, a surface layer comprising a portion of the glass batch and foam forms over the molten glass. A plurality of thermograms of the interior of the glass melting furnace is obtained. The thermograms are analyzed to determine whether there is instability in the thermodynamics of the surface layer. The set of control parameters are then adjusted to reduce a determined instability in the thermodynamics of the surface layer.

4 Claims, 7 Drawing Sheets form production, foam/glass batch interface, and refractory outgassing. Video technologies using charge-coupled device ("CCD") or complementary metal-oxide-semiconductor ("CMOS") sensors have been used to capture images of the interior of a melting furnace. However, these video technologies have been unable to produce clean images in the presence of gas or foam within the melting furnace. The visible wavelengths (400-650 nm) used in these video technologies cannot penetrate the gas; therefore it is not possible to see behind the gas flames. Also, the video sensors are insensitive to temperature and not useful in thermal mapping of the melting furnace. Instead, thermocouples on the bottom of the melting furnace and thermal output of the burners at the crown of the melting furnace are being relied upon to assess temperature distribution within the melting furnace.

GLASS MELTING METHOD, SYSTEM, AND APPARATUS

CROSS-REFERENCE TO RELATED APPLICATIONS

This application claims the benefit of priority under 35 U.S.C. §119 U.S. Provisional Application No. 61/447,356, titled "Furnace Interior Imaging Apparatus and System," filed on Feb. 28, 2011 the content of which is relied upon and incorporated herein by reference in its entirety.

TECHNICAL FIELD

The invention relates generally to production of glass. More specifically, the invention relates to monitoring of conditions within a glass melting furnace.

BACKGROUND

Fusion down-draw process is used to make sheet glass. This process naturally produces sheet glass with pristine surfaces of fire-polished quality, and as such is valuable for making glass substrates for display applications and other applications requiring high-quality glass surfaces. The basic fusion down-draw process is described in U.S. Pat. No. 3,338,696 (published 29 Aug. 1967; Dockerty) and U.S. Pat. No. 3,682,609 (published 8 Aug. 1972; Dockerty). In general, the fusion down-draw process involves delivering molten glass to a weir of a fusion isopipe. The molten glass is allowed to overflow the top of the weir, where the overflowing molten glass divides into two separate streams that flow down opposite converging sidewalls of the fusion isopipe. The divided streams merge into a single stream at the root of the fusion isopipe. The single stream is then drawn down into a sheet glass. The inner surfaces of the divided streams that contact the sidewalls of the fusion isopipe end up in the interior of the sheet glass, while the outer surfaces of the divided streams that do not contact the sidewalls of the fusion isopipe end up on the exterior of the sheet glass, thereby endowing the sheet glass with the pristine surfaces of fire-polished quality.

Delivering the molten glass to the weir of the fusion isopipe is not a trivial matter because the quality of the sheet glass produced by the fusion draw process is directly dependent on the quality of the molten glass delivered to the fusion isopipe. Features such as inhomogeneity of the molten glass, both in terms of composition and temperature distribution, and solid or gas inclusions in the molten glass are not desirable. For production of large-scale commercial glasses, the delivery system usually includes a melting furnace, a refining furnace, and a stirring furnace. A glass batch is received in the melting furnace and melted to produce molten glass. Typically, gas is burned to provide the heat for melting the glass batch. The molten glass is continuously drawn from the melting furnace into the refining furnace, where gas inclusions are removed from the molten glass. The molten glass is then stirred in the stirring furnace to improve its homogeneity and delivered to the inlet of the fusion pipe, typically through an arrangement of a delivery pipe and downcomer.

The melting furnace is perhaps the most critical of the three furnaces in the delivery system since it is in the melting furnace that the molten glass is produced. While melting the glass batch in the melting furnace, it is important to monitor conditions within the melting furnace. The results of the monitoring may be used to adjust the operation of the melting furnace so that the melting furnace operates efficiently and produces high-quality molten glass. Examples of conditions that could be monitored are temperature changes, molten glass flow patterns, molten glass/glass batch interface, foam production, foam/glass batch interface, and refractory outgassing. Video technologies using charge-coupled device ("CCD") or complementary metal-oxide-semiconductor ("CMOS") sensors have been used to capture images of the interior of a melting furnace. However, these video technologies have been unable to produce clean images in the presence of gas or foam within the melting furnace. The visible wavelengths (400-650 nm) used in these video technologies cannot penetrate the gas; therefore it is not possible to see behind the gas flames. Also, the video sensors are insensitive to temperature and not useful in thermal mapping of the melting furnace. Instead, thermocouples on the bottom of the melting furnace and thermal output of the burners at the crown of the melting furnace are being relied upon to assess temperature distribution within the melting furnace.

SUMMARY

A method of melting glass according to one aspect of the invention includes operating a glass melting furnace under a set of control parameters. In the method, a glass batch is fed into the glass melting furnace and melted into molten glass. During the melting, a surface layer including glass batch and foam forms over the molten glass. A plurality of thermograms of the interior of the glass melting furnace is obtained. The thermograms are analyzed to determine whether there is instability in the thermodynamics of the surface layer. Then, the set of control parameters are adjusted to reduce a determined instability in the thermodynamics of the surface layer.

In one embodiment, the thermograms are obtained during at least a portion of the melting of the batch.

In one embodiment, analysis of the thermograms includes analyzing at least one of the thermograms to obtain a first temperature profile along a first interrogation path and a second temperature profile along a second interrogation path. The first and second temperature profiles are compared to determine to what degree the first and second temperature profiles are different.

In one embodiment, analysis of the thermograms includes subdividing a portion of at least one of the thermograms corresponding to the surface layer into symmetrical halves. The halves are compared to determine to what degree the halves are thermally asymmetric.

In one embodiment, the glass batch is fed into the glass melting furnace through a first feed window and a second feed window in a wall of the furnace.

In one embodiment, a first batch fill rate of the first feed window and a second batch fill rate of the second feed window are determined from at least one of the thermograms. The first batch fill rate is compared to the second batch fill rate to determine to what degree the first batch fill rate and the second batch fill rate are different.

A glass melting system according to another aspect of the invention includes a furnace having a viewing port in a wall thereof. The glass melting system includes a support and an infrared camera coupled to the support. The infrared camera includes an infrared sensor and a lens, where the lens is optically coupled to the infrared sensor. An actuator is coupled to the support and is operable to move the support such that the lens is selectively inserted into or retracted out of the viewing port.

In one embodiment, the glass melting system includes a shutter mounted on the wall to control access into the viewing port.

In one embodiment, the glass melting system includes a storing means for storing the thermograms recorded by the infrared sensor and a processing means for processing the thermograms recorded by the infrared sensor.

In one embodiment, the processing means is configured to analyze the thermograms recorded by the infrared sensor and determine whether there is instability in the thermodynamics of a surface layer comprising glass batch and foam inside the furnace.

In one embodiment, the glass melting system includes a controller which generates controls for operating the furnace in response to a result of the analysis of the thermograms.

In one embodiment, the glass melting system includes a plurality of sensors for monitoring temperature and flow rate at a plurality of points in the furnace.

In one embodiment, the controller receives inputs from the sensors for monitoring temperature and flow rate.

A glass melting furnace imaging apparatus according to yet another aspect of the invention includes a support, an infrared sensor coupled to the support, a lens coupled to the support and optically coupled to the infrared sensor, and an actuator coupled to the support for moving the support.

In one embodiment, the glass melting furnace imaging apparatus includes a thermally-controlled sensor jacket in which the infrared sensor is disposed.

In one embodiment, the glass melting furnace imaging apparatus includes a thermally-controlled shroud in which the lens is disposed.

In one embodiment, the thermally-controlled shroud has two independent flow paths for circulating cooling fluids through or around the lens.

In one embodiment, the lens is a sapphire lens.

In one embodiment, the lens is a cylindrical lens.

In one embodiment, the glass melting furnace imaging apparatus includes a band-pass filter disposed in an optical path between the infrared sensor and lens.

In one embodiment, the band-pass filter has a central wavelength of approximate 0.85 µm.

It is to be understood that both the foregoing summary and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth in the detailed description that follows and, in part, will be readily apparent to those skilled in the art from that description or recognized by practicing the invention as described herein.

Figure 1:
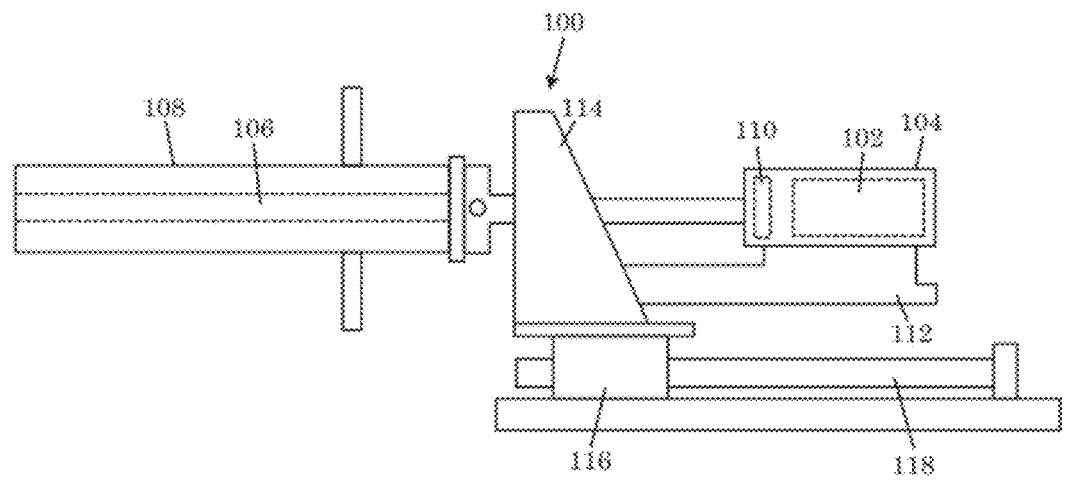
FIG. 1 is a schematic of an apparatus for monitoring a glass melting furnace interior.

In one embodiment of the invention, as shown in FIG. 1, an apparatus 100 for monitoring a furnace interior, such as a glass melting furnace interior, includes a two-dimensional ("2D") infrared (IR) sensor 102 disposed in a sensor jacket 104. In one embodiment, the sensor jacket 104 is a thermally-controlled jacket. The thermal control in the sensor jacket 104 may be by circulation of fluid such as water or air through the sensor jacket 104. The apparatus 100 further includes a lens 106 disposed in a lens shroud 108. The lens 106 may be any suitable focusing lens. In one embodiment, the lens 106 is made of sapphire. In other embodiments, other lens materials that can withstand high temperatures may be used. In one embodiment, the lens shroud 108 is a thermally-controlled shroud. The thermal control in the lens shroud 108 may be by circulation of fluid such as water or air through the lens shroud 108.

The 2D IR sensor 102 and lens 106 constitute an IR camera. The IR camera detects radiation in the IR range of the electromagnetic spectrum. The recordings made by the IR camera are known as thermograms. These thermograms are sensitive to temperature and will enable thermal mapping of the furnace interior. The IR camera can record thermograms in the presence of gaseous medium in the furnace interior. In one embodiment, a band-pass filter 110 is disposed in an optical path between the IR sensor and the lens. The central wavelength of the band-pass filter 110 is based on the spectrum of the gaseous medium in the furnace interior so as to remove the semi-opaqueness in the detected radiation due to the gaseous medium. In one embodiment, the band-pass filter has a central wavelength of 0.85 µm. This wavelength is one of two windows in the spectrum of natural gas that allows optical transmissivity through the gas.

The sensor jacket 104 is mounted on a base 112, which is attached to a frame 114. The lens shroud 108 is also attached to the frame 114. The frame 114 is attached to a base 116, which is a movable part of a linear actuator 118. The frame 114 and all the components attached to it can thus be moved by operation of the linear actuator 118. Various types of linear actuators may be used. In one embodiment, a pneumatic actuator is used as the linear actuator.

Figure 2:
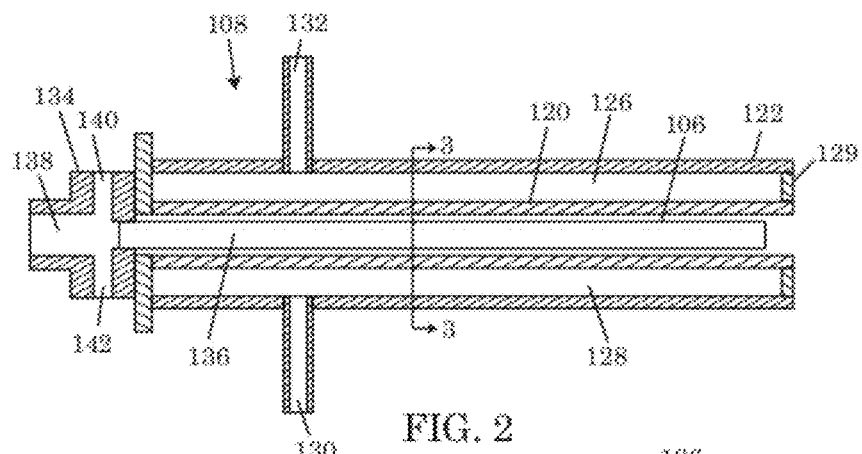
FIG. 2 is a cross-sectional view of a lens shroud.
Figure 3:
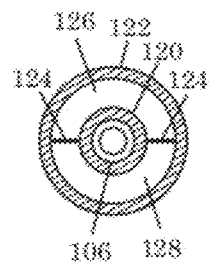
FIG. 3 is a cross-sectional view of the lens shroud of FIG. 2 along line 3-3.

In FIG. 2, the lens shroud 108 includes an inner tube 120 and an outer tube 122. The inner and outer tubes 120, 122 are made of a material that can withstand high temperatures and that is resistant to oxidation. Stainless steel is a suitable example. Noble metals such as platinum are also suitable but expensive. Instead of making the entire tubes 120, 122 from a noble metal, the tips of the tubes 120, 122 only may be made of a noble metal. The inner tube 120 is concentric with and spaced from the outer tube 122. In FIG. 3, baffles 124 arranged between the inner tube 120 and outer tube 122 define a semi-annular upper chamber 126 and a semi-annular lower chamber 128 between the inner tube 120 and outer tube 122. The baffles 124 are shorter than the tubes 120, 122 so that the semi-annular chambers 126, 128 merge at the front end of the lens shroud 108 (in FIG. 2). The front end of the lens shroud 108 is shown at 129 in FIG. 2. The space between the inner tube 120 and outer tube 122 is closed at the front end of the lens shroud 108 so that fluid received in the annular chambers 126, 128 is contained in the annular chambers 126, 128.

In FIG. 2, the outer tube 122 has a supply port 130 that is connected to the lower chamber 128 and a return port 132 that is connected to the upper chamber 126. In use, a source of cooling fluid, such as a source of chilled water, is connected to the supply port 130. Cooling fluid will flow from the supply port 130 into the lower chamber 128, to the tip of the lens shroud 108, and into the upper chamber 126. The fluid in the upper chamber 126 is drained off through the return port 132. The lens shroud 106 includes a lens holder 134, which supports the lens 106 inside the inner tube 120. In one embodiment, the lens 106 is a hollow cylindrical lens having a bore 136. The lens holder 134 has a bore 138, which is aligned with the lens bore 136, and an inlet port 140 and outlet port 142 that are connected to the bore 138. The ports 140, 142 are used to supply cooling air into the bores 136, 138, where the cooling air flows inside the lens 106 to keep the lens 106 cool.

Figure 4:
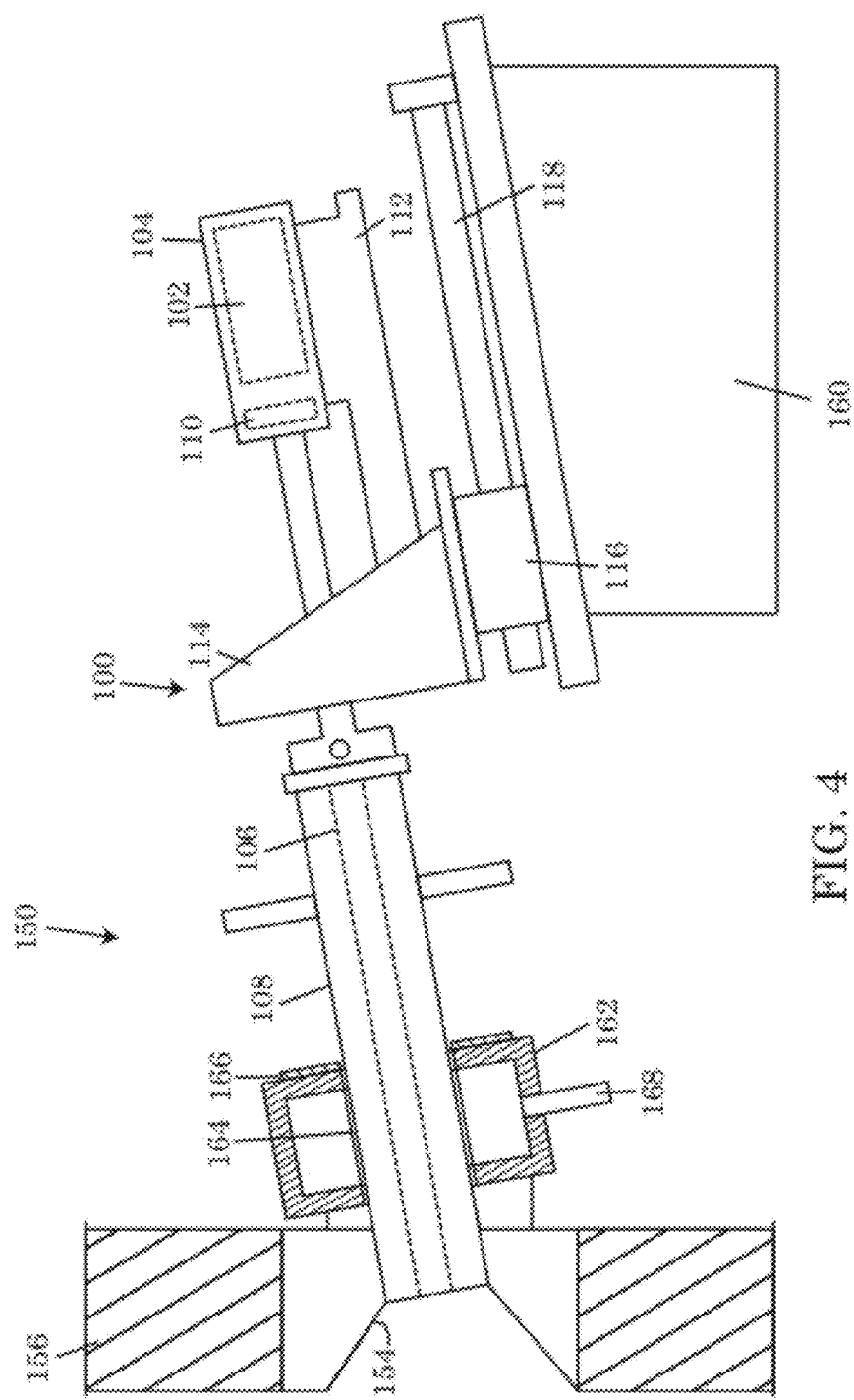
FIG. 4 is a schematic of a system for monitoring a glass melting furnace interior.

In FIG. 4, a system 150 for monitoring a furnace interior includes a viewing port 154 in a furnace wall 156. The system 150 includes the apparatus 100 for monitoring the furnace interior. The apparatus 100 is supported adjacent to the viewing port 154, e.g., on a stand 160. In this position, the linear actuator 118 can be operated to insert the lens shroud 108 into the viewing port 154 in order to image the furnace interior. The stand 160 may include means for tilting the apparatus 100 so that lens 106 can be placed at a desired viewing angle relative to the furnace interior. The system 150 includes a shutter box 162 mounted at the entrance of the viewing port 154. The shutter box 162 includes a passage 164 through which the lens shroud 108 can be inserted into and retracted from the viewing port 154. A retractable shutter 166 is provided at an end of the passage 164 and is operable to open and close access to the passage 164. The shutter box 162 includes a port 168 through which cooling air can be supplied into the passage 164. The air received in the passage 164 will flow around the lens shroud 108 to the tip of the lens shroud 108.

Figure 5:
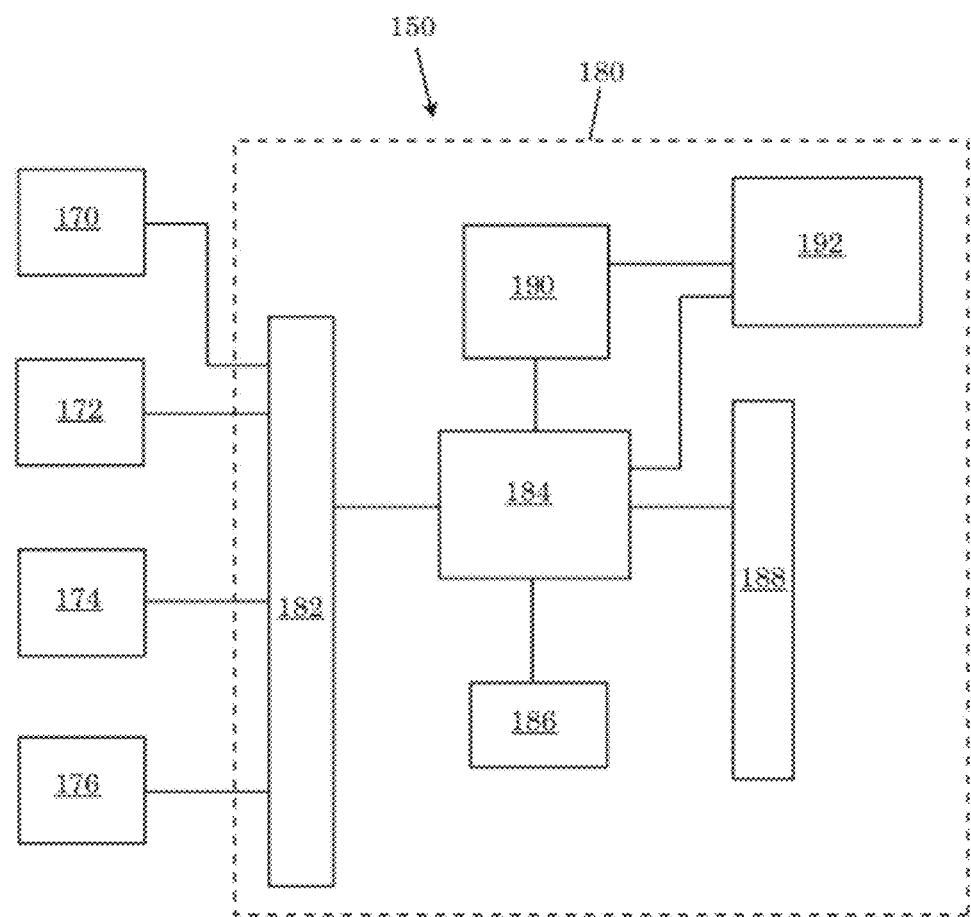
FIG. 5 is a block diagram of the controls portion of the system of FIG. 4.

FIG. 5 shows the controls portion of the system 100. The system 150 includes lens sensors 170, e.g., thermocouples coupled to the lens 106 (in FIG. 2) for measuring the temperature of the lens 106. The system 150 includes lens shroud sensors 172, e.g., flow sensors coupled to the ports 140, 142 (in FIG. 2) of the lens holder 134 (in FIG. 2) and ports 130, 132 (in FIG. 2) of the outer tube 122 (in FIG. 2) for monitoring flow rates through these ports. The system 150 includes shutter box sensor 174, e.g., a flow sensor coupled to the port 168 (in FIG. 4) of the shutter box 162 (in FIG. 4) for measuring flow rates through this port. The system 150 may include sensor jacket sensors 176, e.g., thermocouples and flow sensors for monitoring the thermal and flow conditions within the sensor jacket 104 (in FIG. 1).

The system 150 includes a controller 180, which receives inputs from the various sensors through an input interface 182. The controller 180 includes a processor 184 for processing the inputs and generating controls for operation of the apparatus 100 and a storage or memory device 186 for storing data and programs. The controls are communicated to the appropriate portion of the apparatus 100 (in FIG. 4) through the output interface 188. In one embodiment, the controller 180 triggers an alarm when there is inadequate cooling of the lens 106. The controller 180 then generates a control for the linear actuator 118 (in FIG. 4) for automatic retraction of the lens shroud 108 (in FIG. 4) from the viewing port 154 (in FIG. 4). The controller 180 may trigger other alarms based on other monitored conditions within the apparatus 100 and take appropriate actions based on the triggered alarms. The controller 180 includes a data acquisition unit 190 for storing and processing thermograms. The data acquisition unit 190 is coupled to the IR sensor 102 to receive the thermograms. The controller 180 may include a display 192 for showing the thermograms and other information related to operation of the apparatus 100.

Figure 6A:
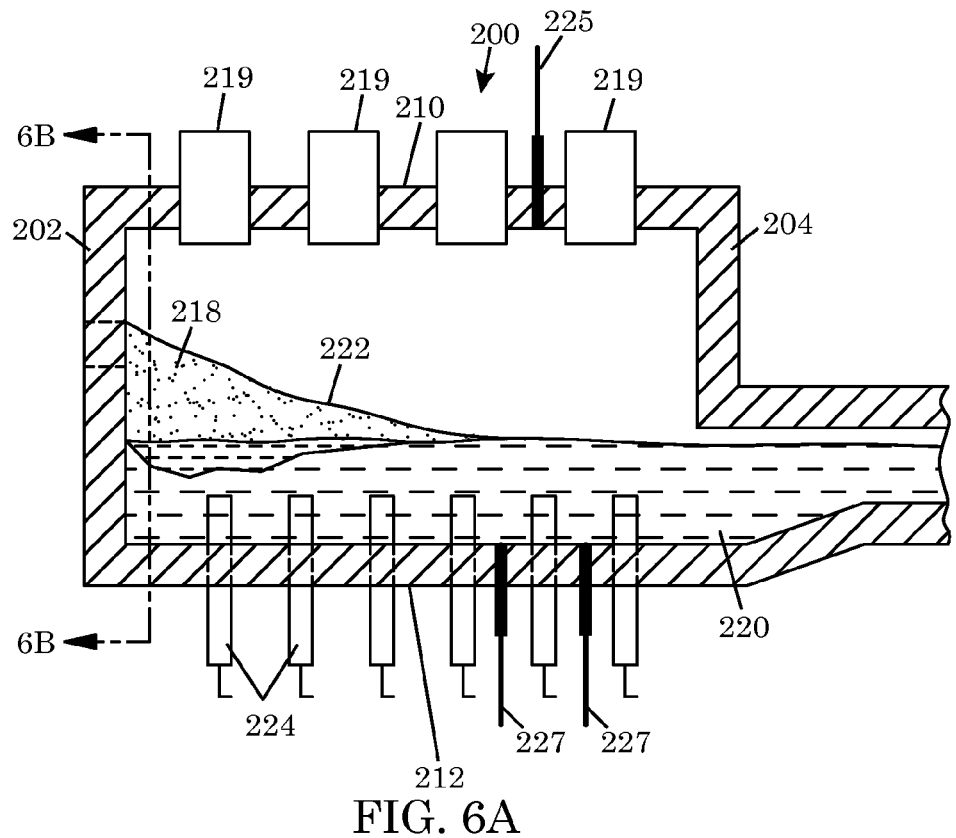
FIG. 6A is a cross-section of a glass melting furnace.
Figure 6B:
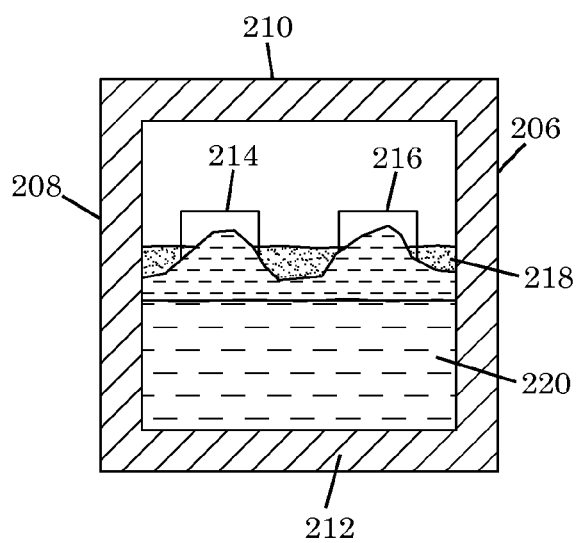
FIG. 6B is a cross-section of the glass melting furnace of FIG. 6A along line 6B-6B.

In FIGS. 6A and 6B, a glass melting furnace 200 has opposing end walls 202, 204 and opposing side walls 206, 208. The length of the furnace 200 is measured along either of the side walls 206, 208. The furnace 200 also has a roof 210 and a floor 212. The furnace end wall 202 includes two feed windows 214, 216 for continuously feeding batch 218 into the furnace 200. The batch 218 may be any suitable raw material for forming molten glass. For display applications, the batch may contain ingredients for forming borosilicate glass. Borosilicate glasses contain $B_2O_3$ and $SiO_2$ and typically also contain $Na_2O$ or $K_2O$ and $Al_2O_3$ and other ingredients to promote formation of the molten glass. Burners 219 are inserted through the furnace roof 210 for melting the batch 218 to form molten glass 220. The melting is gradual, with a volume of molten glass 220 pooling at the bottom of the furnace 200 and a surface layer 222 of batch and foam floating on top of the molten glass. A plurality of parallel electrodes 224 are submerged within the pool of the molten glass 220, e.g., through the furnace floor. An electric current is caused to flow through the molten glass 220 between the electrodes 224 to heat the molten glass. Temperature differences between the surface layer 222 and molten glass 220 due to the addition of new batch to the furnace 200 and gradual melting of the batch to form the molten glass induce a convective pattern in the volume of molten glass 220.

Thermally induced "hot spots" or "spring zones" are typically established within higher throughput glass melting furnaces as a means to improve melting performance. It is well established in the glass manufacturing industry that these spring zones provide a useful tool by which to stabilize batch patterns, hold batch in a predetermined area of the melter, and to promote the homogeneity of the molten glass. Accurate and consistent control of these spring zones is essential for the efficient operation of the melting furnace. These spring zones may be established longitudinally, laterally, or both, relative to the furnace geometry in order to create the convective patterns desired by the operator. Traditionally, these are monitored through means of monitoring thermocouples located in the crown or bottom of the furnace and/or by manually taking individual optical pyrometer measurements to a target wall through viewports in the furnace. Adjustments to energy inputs may be conducted based on these measurements in an effort to main the thermal profiles that induce these spring zones. The location of these spring zones is typically two-thirds of the length of the melting furnace from the fill end, although this position may be tailored to a specific melting system based on design or need.

In one embodiment, one or more thermally induced hot zone or spring zone is established in the furnace 200. The location of the hot spot(s) or spring zone(s) may be, in one embodiment, about half to two-thirds of the length of the furnace 200 from the fill end wall 202. The spring zone will reverse flow of the molten glass 220 at a particular location in the furnace. The flow reversal will help with mixing and homogeneity of the molten glass 220. Temperature sensors may be placed at various locations in the furnace 200 to assist with monitoring temperatures at these locations. For example, temperature sensors 225, 227 could be placed at the furnace roof 210 and furnace floor 212, respectively. The output of the temperature sensors 225, 227 could assist in controlling temperatures within the furnace.

High-quality molten glass is needed for making high-quality sheet glass, such as useful for display applications. A high-quality molten glass should have a highly homogenized glass composition, i.e., should be free of silica stones. A high-quality molten glass should not have gaseous or solid inclusions, e.g., should be free of zircon particles that would potentially impact the forming process of the sheet glass by creating streaks or cords in the sheet glass—the streaks or cords would render the sheet glass useless for display applications as they would cause localized changes in optical properties. To make such a high-quality molten glass, careful control of melting parameters is needed. Typical melting parameters to be controlled are voltage of each electrode pair as a function of glass resistivity, temperature profile along the length of the furnace (to ensure optimum convective profile leading to maximum homogeneity of the glass), and heat flux for each burner pair (to ensure a specific thermal gradient along the surface layer). This multivariate space has a complex impact on the thermodynamics inside the furnace. As of today, melting parameters such as described above are screened and acted upon in a stochastic manner, i.e., as a random volumetric statistical distribution, as opposed to in a localized manner. Thermodynamics of the surface layer, in terms of full 2D temperature distribution and three-dimensional ("3D") dynamics of the batch pile(s), is one of the feedbacks currently missing to quantitatively monitor and precisely control the melting process in a localized manner.

In one embodiment of the invention, the system 150 (in FIGS. 4 and 5) is used to provide the missing feedback mentioned above. The system 150 is used to capture images of the interior of the glass melting furnace. These images are recorded as 2D thermograms that can be analyzed for trends in the dynamics of the batch pile(s) in the glass melting furnace. As previously described, the apparatus 100 (in FIGS. 1 and 2) includes an IR sensor 102 (in FIG. 1) for recording the thermograms. To use the system with the glass melting furnace described above, a viewing port (similar to the viewing port 154 in FIG. 4) is formed in a furnace wall, and the lens end of the apparatus 100 is inserted into the viewing port as already described above to record the thermograms. The furnace wall in which the viewing port is formed may be the end wall 204 (in FIG. 6A) opposite to the end wall 202 (in FIG. 6A) in which the feed windows are formed, i.e., to allow capturing of the portion of the furnace including the feed end wall 204. The system 150 can make accurate recordings through flames from the burners 219 (in FIG. 6A) at the furnace roof 210 (in FIG. 6A), through gas in the furnace 200 (in FIG. 6A), and through foam in the surface layer covering the molten glass 220 (in FIG. 6A). The system 150 can deliver real-time recording of thermograms, which can be analyzed as mentioned above. In particular, the thermograms can be used to assess the stability of the surface layer thermodynamics. The results of the analysis can be further used to optimize the melting parameters so that the surface layer thermodynamics is stable during production of the molten glass. By keeping the surface layer thermodynamics stable, high-quality molten glass can be produced in an efficient manner, i.e., with only the necessary changes being made to the melting operation to achieve melting stability.

In one embodiment of the invention, a method of making molten glass includes operating a glass melting furnace, an example of which is described above in FIGS. 6A and 6B, using a set of control parameters. The control parameters are the physical inputs into the system, such as the input that determines the amount of heat flux each burner produces, the input that determines the amount of heat flux each electrode pair produces, and the input that determines the rate at which batch is fed into the furnace through the windows. The melting parameters, examples of which have been given above, are affected by adjustment of these control parameters. The method includes feeding a glass batch into the glass melting furnace and melting the batch into molten glass. A surface layer including batch and foam will form over the molten glass during the melting.

The method includes using the system 150 (in FIGS. 4 and 5) to obtain thermograms of the surface layer. The thermograms may be collected over hours, days, or months and at different viewing angles relative to the interior of the furnace. The method includes interrogating or analyzing the thermograms to determine if the thermodynamics of the surface layer is stable or unstable. Typically, the thermodynamics will be considered to be stable if the flow pattern and/or the temperature distribution of the surface layer is generally symmetric about a centerline of the furnace, and unstable otherwise. The centerline of interest would generally be along the length of the furnace, i.e., extending from the feed end of the furnace, where batch is fed into the furnace, to the discharge end of the furnace, where molten glass flows out of the furnace. Other criteria may be used to determine if the thermodynamics of the surface layer is stable. If the surface layer thermodynamics is found to be unstable, one or more of the control parameters are adjusted to reduce or eliminate the determined instability. The adjustment may occur in multiple sub-steps. The interrogating of thermograms and adjusting of control parameters may be performed throughout the process of making the molten glass or until optimum values have been found for the set of control parameters.

Figure 7A:
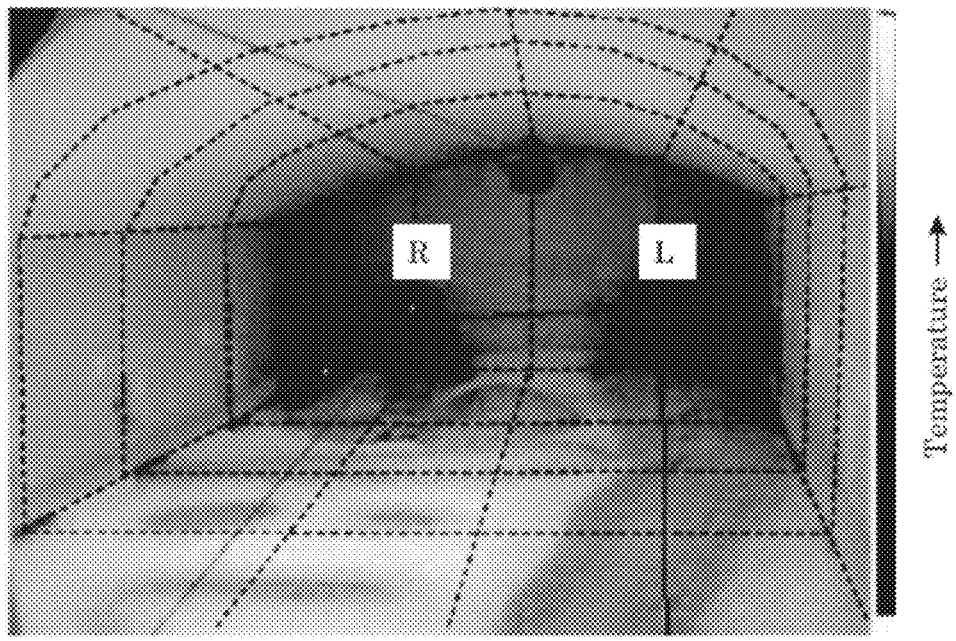
FIG. 7A is a thermal map of a glass melting surface interior and depicts imbalanced surface layer flow.
Figure 7B:
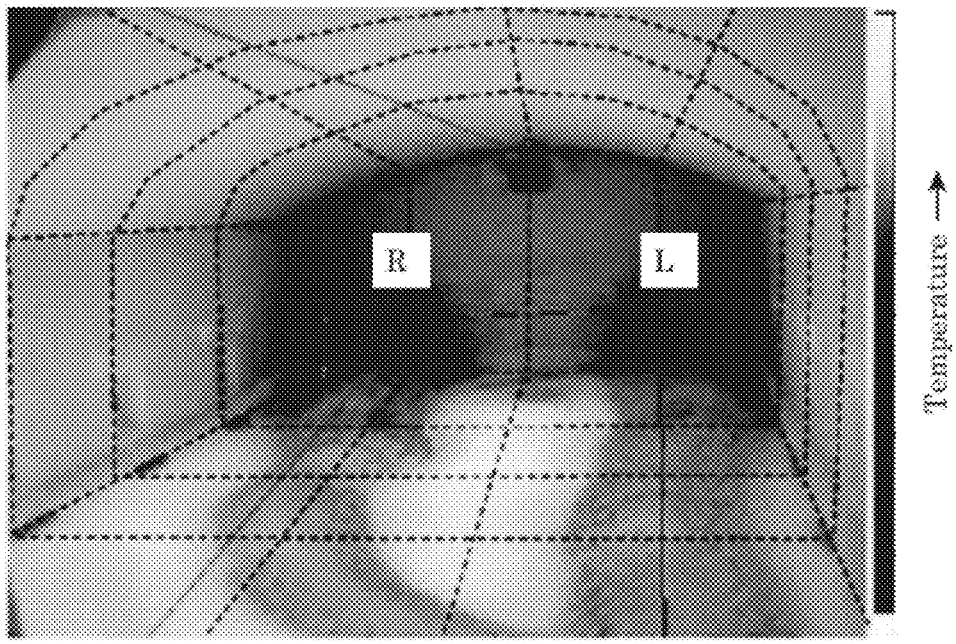
FIG. 7B is a thermal map of a glass melting surface interior and depicts balanced surface layer flow.

Thermograms can provide a full-field temperature distribution of the surface layer including batch and foam in a furnace. FIGS. 7A and 7B show thermal maps prepared from two thermograms, which were extracted from a sequence of thermograms captured from a furnace using the system 150 (in FIGS. 4 and 5). The surface layer flow in FIG. 7A is imbalanced. That is, the flow is hotter on the right side R of the furnace than on the left side L of the furnace. Right and left are from the view point of the end wall in which the feed windows are located. On the other hand, the surface layer flow in FIG. 7B is relatively balanced. An imbalanced flow such as shown in FIG. 7A, if it persists through a sequence of thermograms, would indicate instability in surface layer thermodynamics that should be corrected.

Figure 8A:
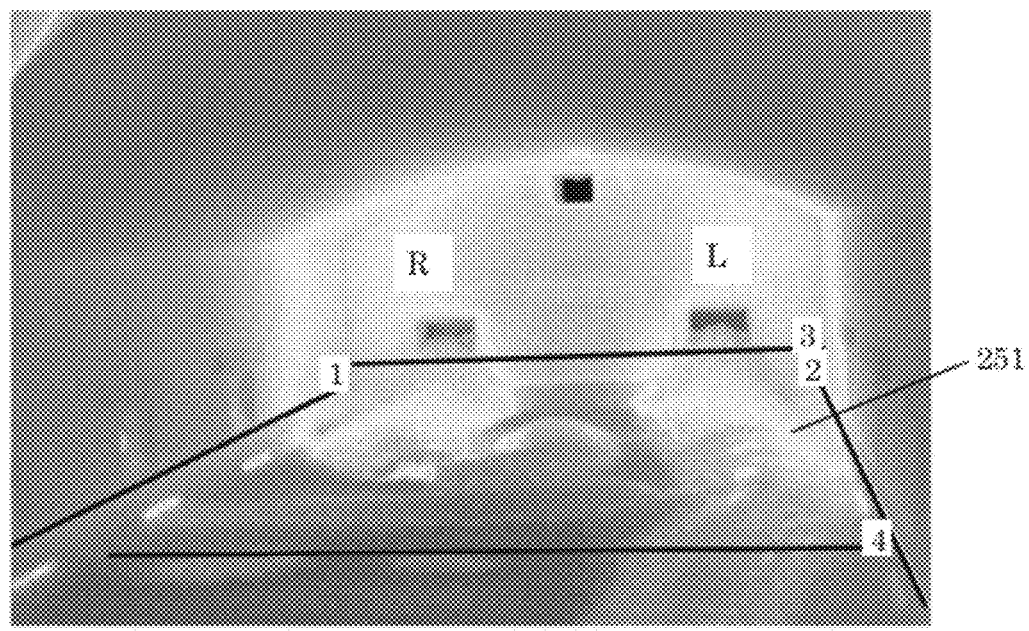
FIG. 8A is a thermal map of a glass melting surface interior.
Figure 8B:
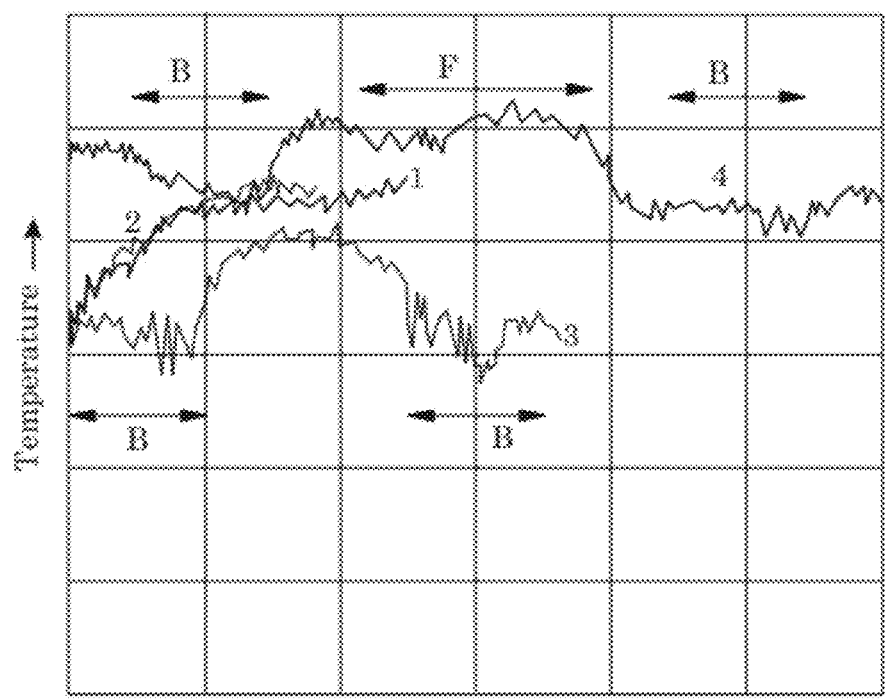
FIG. 8B shows temperature profiles along various interrogation paths on the thermal map of FIG. 8A.
Figure 9:
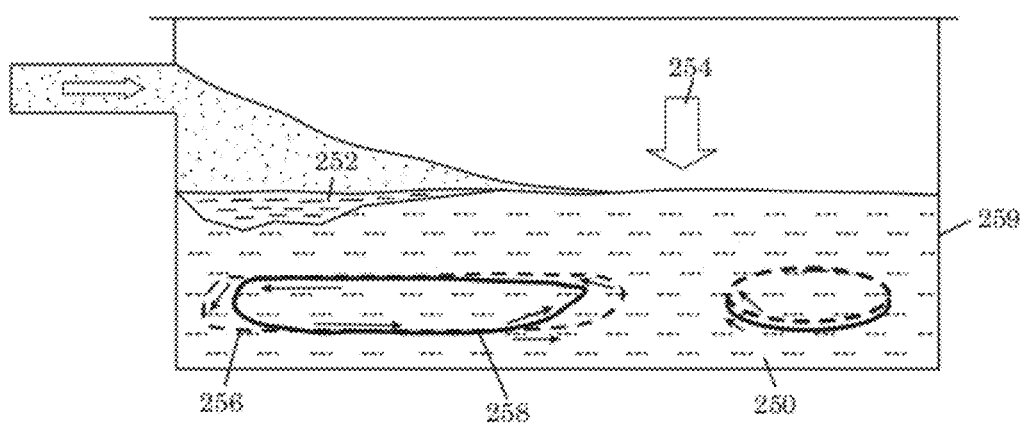
FIG. 9 is a hypothetical convective motion of molten glass in a glass melting furnace.

FIG. 8A shows a thermal map prepared from a thermogram that could be captured from the interior of a furnace using the system 150 (in FIGS. 4 and 5). Lines 1, 2, 3, 4 represent interrogation paths of interest. The temperature profiles along interrogation paths 1, 2, and 4 are shown in FIG. 8B. In FIG. 8B, F represents foam and B represents batch. Ideally, the temperature profiles along the parallel interrogation paths 1 and 2 would be very similar. However, this is not the case in FIG. 8B. The difference in these temperature profiles is an indication of surface layer thermodynamics instability. The "snaking" nature of the left batch 251 is another indication of surface layer thermodynamics instability. Such snaking might lead to the situation hypothetically portrayed in FIG. 9. In FIG. 9, the molten glass 250 under the molten batch 252 is subjected to different convective conditions that might cause the desirable hot spot 254 to wander off from its desirable location to the hotter side of the furnace 259, thereby creating convective paths 256, 258 on the left side L and right side R of the furnace, respectively, that are asymmetric within the volume of the molten glass. Such asymmetric convective pattern could have an impact on the glass attributes. Thus, in one embodiment, interrogation of the thermograms to determine the presence of surface layer thermodynamics instability involves looking for abnormalities in surface layer temperature distribution and flow.

There are various ways of interrogating the thermograms for information about surface layer thermodynamics instability. In one embodiment, the thermograms are loaded into a video player or a computer equipped with a video player. An operator then plays back a sequence of thermograms captured at a selected frequency range, e.g., between $\frac{1}{120}$ Hz and 30 Hz, at a selected speed. While playing back the thermograms, the operator inspects the thermograms for trends in the surface layer thermodynamics. In another embodiment, an automated tool takes the thermograms as input, analyzes the thermograms for trends in surface layer thermodynamics, and generates various outputs useful in assessing stability of surface layer thermodynamics. The automated tool may be any general purpose computer that runs a computer-executable program designed to carry out the tasks of analyzing the thermograms and generating outputs useful in assessing surface layer thermodynamics instability.

In one example, the program, when executed by a processor (e.g., 184 in FIG. 5), selects a thermogram, e.g., from a storage or memory device or a data acquisition unit (e.g., 186, 192 in FIG. 5), and generates thermal profiles along chosen interrogation lines, e.g., lines above the foam layer on the left side and the right side of the melting furnace. These profiles provide instantaneous temperature profiles in the vicinity of the glass along the left and right sides of the melting furnace. The program can generate the thermal profiles for several thermograms so that an operator can observe how the thermal profiles are changing over time. The program may also compare the thermal profiles obtained from each thermogram and generate flags indicating surface layer thermodynamics instability if significant differences between the thermal profiles are found. In addition to generating flags, the program may raise alarms if significant instability is detected.

In another example, the program selects a thermogram and divides the portion of the thermogram corresponding to the surface layer into symmetrical halves, the division being along the length of the furnace. The program then compares the temperature of the halves. For example, the program can calculate an average temperature for each of the halves and then compare the average temperatures. If there are significant differences in the average temperatures, the program can generate a flag indicating surface layer thermodynamics instability. This process can be repeated for several thermograms so that an operator can observe how the symmetry or asymmetry between the surface layer halves is changing over time.

In another example, the program computes the ratio of batch versus air for each feed window from a thermogram. From this ratio, the instantaneous fill rate for each feed window is determined. The fill rate for the left feed window can be compared to the fill rate for the right window to determine whether there is feed asymmetry. If a feed asymmetry is discovered, the program may generate a flag that would prompt an operator to correct the feed asymmetry, since such feed asymmetry can produce imbalanced flow in the surface layer in the furnace. The program may alternately adjust the control parameter responsible for the fill rates at the feed windows. The adjustment may be until feed symmetry is achieved between the two feed windows.

The program can display the results of the thermogram analysis alongside the melting parameters (e.g., glass bottom thermocouple outputs, voltage to ground on each electrode pair, heat flux of each burner pair, melter air pressure) so that the effect of adjusting the control parameters on the melting parameters can be readily assessed. The program may also indicate which control parameters to adjust based on the results of the thermogram analysis. The program may also directly adjust the control parameters in order to achieve a more stable surface layer thermodynamics. The program may also raise alarms, as explained above.

The systems/techniques disclosed above can be fully automated/autonomous via software configured with algorithms to perform operations as described above. These aspects can be implemented by programming one or more suitable general-purpose computers having appropriate hardware. The programming may be accomplished through the use of one or more program storage devices readable by processor(s) and encoding one or more programs of instructions executable by the computer for performing the operations described above. The program storage may take the form of, for example, one or more floppy disks, a CD ROM or other optical disk, a magnetic tape, a read-only memory chip (ROM), and other forms of the kind well known in the art or subsequently developed. The program of instructions may be object code, i.e., in binary form that is executable more or less directly by the computer, in source code that requires compilation or interpretation before execution, or in some intermediate form such as partially compiled code. The precise forms of the program storage device and of the encoding of instructions are immaterial here.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for melting glass, comprising:
   (i) operating a glass melting furnace under a set of control parameters;
   (ii) feeding a glass batch into the glass melting furnace;
   (iii) melting the glass batch into molten glass, wherein during the melting a surface layer comprising a portion of the glass batch and foam forms over the molten glass;
   (iv) obtaining a plurality of thermograms of an interior of the glass melting furnace;
   (v) analyzing the thermograms to determine whether there is instability in the thermodynamics of the surface layer;
   (vi) adjusting the set of control parameters to reduce a determined instability in the thermodynamics of the surface layer, wherein step (v) comprises:
   (vii) analyzing at least one of the thermograms to obtain a first temperature profile along a first interrogation path and a second temperature profile along a second interrogation path; and
   (viii) comparing the first and second temperature profiles to determine to what degree the first and second temperature profiles are different.

2. The method of claim 1, wherein step (iv) occurs during at least a portion of step (iii).

3. A method for melting glass, comprising:
   (i) operating a glass melting furnace under a set of control parameters;

(ii) feeding a glass batch into the glass melting furnace;
(iii) melting the glass batch into molten glass, wherein during the melting a surface layer comprising a portion of the glass batch and foam forms over the molten glass;
(iv) obtaining a plurality of thermograms of an interior of the glass melting furnace;
(v) analyzing the thermograms to determine whether there is instability in the thermodynamics of the surface layer;
(vi) adjusting the set of control parameters to reduce a determined instability in the thermodynamics of the surface layer, wherein step (v) comprises:
(ix) subdividing a portion of at least one of the thermograms corresponding to the surface layer into symmetrical halves; and
(x) comparing the halves to determine to what degree the halves are thermally asymmetric.

4. A method for melting glass, comprising:
(i) operating a glass melting furnace under a set of control parameters;
(ii) feeding a glass batch into the glass melting furnace;
(iii) melting the glass batch into molten glass, wherein during the melting a surface layer comprising a portion of the glass batch and foam forms over the molten glass;
(iv) obtaining a plurality of thermograms of an interior of the glass melting furnace;
(v) analyzing the thermograms to determine whether there is instability in the thermodynamics of the surface layer;
(vi) adjusting the set of control parameters to reduce a determined instability in the thermodynamics of the surface layer,
wherein step (ii) comprises feeding the batch through a first feed window and a second feed window in a wall of the furnace, and
wherein step (v) comprises:
(xi) determining a first batch fill rate of the first feed window and a second batch fill rate of the second feed window from at least one of the thermograms; and
(xii) comparing the first batch fill rate to the second batch fill rate to determine to what degree the first batch fill rate and the second batch fill rate are different.

* * * * *